United States Patent
Yoshii et al.

(10) Patent No.: US 11,379,319 B2
(45) Date of Patent: Jul. 5, 2022

(54) LAN-FREE AND APPLICATION CONSISTENT BACKUP METHOD

(71) Applicant: Hitachi, Ltd., Tokyo (JP)

(72) Inventors: Yoshihiro Yoshii, Cupertino, CA (US); Tomohiro Kawaguchi, Santa Clara, CA (US)

(73) Assignee: HITACHI, LTD., Tokyo (JP)

(*) Notice: Subject to any disclaimer, the term of this patent is extended or adjusted under 35 U.S.C. 154(b) by 71 days.

(21) Appl. No.: 16/911,001

(22) Filed: Jun. 24, 2020

(65) Prior Publication Data

US 2021/0406134 A1    Dec. 30, 2021

(51) Int. Cl.
*G06F 3/06*    (2006.01)
*G06F 11/14*    (2006.01)

(52) U.S. Cl.
CPC .......... *G06F 11/1469* (2013.01); *G06F 3/067* (2013.01); *G06F 3/0619* (2013.01); *G06F 3/0629* (2013.01); *G06F 11/1451* (2013.01); *G06F 11/1461* (2013.01); *G06F 11/1464* (2013.01)

(58) Field of Classification Search
None
See application file for complete search history.

(56) References Cited

U.S. PATENT DOCUMENTS

| | | | |
|---|---|---|---|
| 5,835,953 A * | 11/1998 | Ohran | G06F 11/1466 711/162 |
| 9,311,328 B2 * | 4/2016 | Patil | G06F 16/1824 |
| 9,720,778 B2 | 8/2017 | Mutalik et al. | |
| 10,176,183 B1 * | 1/2019 | Shim | G06F 3/065 |
| 2004/0205294 A1 * | 10/2004 | Nakayama | G06F 3/0605 711/114 |
| 2012/0078856 A1 * | 3/2012 | Linde | G06F 11/1469 707/679 |
| 2012/0233419 A1 * | 9/2012 | Yamashita | G06F 11/1461 711/162 |
| 2016/0179419 A1 * | 6/2016 | Yamaguchi | G06F 3/0683 711/162 |
| 2017/0235506 A1 * | 8/2017 | Thiam | G06F 11/1448 711/162 |
| 2018/0046553 A1 * | 2/2018 | Okamoto | G06F 11/1451 |

* cited by examiner

*Primary Examiner* — Kaushikkumar M Patel
(74) *Attorney, Agent, or Firm* — Procopio, Cory, Hargreaves & Savitch LLP

(57) ABSTRACT

A storage system is connected to a backup storage system over a Storage Area Network (SAN). The backup storage system is managed by a backup server. The storage system includes a primary volume, a secondary volume configured to be mounted to a backup volume in the backup storage system and configured to be paired with the primary volume, and a processor configured to, for receipt of a backup operation request from the backup server, copy the primary volume to the secondary volume through a pair operation based on an Input/Output (I/O) between the storage system and a host computer managing the storage system, mount the secondary volume to the backup volume, and based on the I/O, copy the secondary volume to the backup volume through the SAN.

12 Claims, 11 Drawing Sheets

31

Backup data management table

| Application name | Backup Date | Volume ID of Of backup source | Volume ID of backup target | Copy status |
|---|---|---|---|---|
| Test_SQL_01 | 2/20/2020 00:00:00 | 1001 | 101 | Done |
| | 2/21/2020 00:00:00 | 1001 | 102 | Done |
| | 2/22/2020 00:00:00 | 1001 | 103 | Done |
| SQL_server | 2/20/2020 00:00:00 | 1002 | 200 | Done |
| | 2/21/2020 00:00:00 | 1002 | 201 | Done |
| | 2/22/2020 00:00:00 | 1002 | 202 | Copying |

Volume management table 21

| Volume ID (211) | Pair Status (212) | Paired Volume ID (213) |
|---|---|---|
| 1000 | Simplex | - |
| 1001 | Pair | 2001 |
| 1002 | Pair splitting | 2002 |
| 1003 | Pair split | 2003 |
| 1004 | Pair | 2004 |
| | | |

FIG. 4

LAN-FREE AND APPLICATION CONSISTENT BACKUP METHOD

BACKGROUND

Field

The present disclosure is directed to storage systems, and more specifically, to systems and methods for facilitating local area network (LAN) free backup.

Related Art

Lost data can have a great impact on corporate performance. For this reason, there has been a need for data protection. In particular, it can be important not only to back up data, but also ensure that restoration can be conducted when a failure occurs. For example, database applications typically write application memory to log files before the contents are committed to the database. When the application data is backed up, the contents of the memory and any pending writes need to be completed and captured in the backup. If the contents of memory are not allowed to flush to disk, the state of the backup is equivalent to that of a power plug being pulled off the server. When the server is recovered from a backup which did not allow the pending Input/Output (I/O) operations to complete, the database will have to follow procedures to replay or integrate logs to the database files. So an application-consistent backup is one that informs the application that a backup is about to take place and allows the application to achieve a quiescent and consistent state by flushing any pending I/O operations to disk. Most related art backup solutions offer the ability to have a backup be application-aware.

To realize an application-aware backup, most related art backup solutions copy data from application server to backup server via local area network (LAN). However, large amounts of data are transferred through the networks, and can thereby cause a slowdown of business-critical operations. With the increase in the data volume in recent years, the number of backup targets has increased. Therefore, the backup server is required to have high throughput to achieve the target RPO (Recovery Point Objective). As another related art approach to avoid a slowdown of business-critical operations, the backup server can schedule backups off the business hours. However, a time schedule approach has difficulty in coping with the workload fluctuation.

SUMMARY

Aspects of the present disclosure involve a storage system connected to a backup storage system over a Storage Area Network (SAN), the backup storage system managed by a backup server, the storage system involving a primary volume; a secondary volume configured to be mounted to a backup volume in the backup storage system and configured to be paired with the primary volume; and a processor configured to, for receipt of a backup operation request from the backup server: copy the primary volume to the secondary volume through a pair operation based on an Input/Output (I/O) between the storage system and a host computer managing the storage system; mount the secondary volume to the backup volume; and based on the I/O, copy the secondary volume to the backup volume through the SAN.

Aspects of the present disclosure involve a method for a storage system connected to a backup storage system over a Storage Area Network (SAN), the backup storage system managed by a backup server, the storage system including a primary volume and a secondary volume configured to be mounted to a backup volume in the backup storage system and configured to be paired with the primary volume, the method involving, for receipt of a backup operation request from the backup server, copying the primary volume to the secondary volume through a pair operation based on an Input/Output (I/O) between the storage system and a host computer managing the storage system; mapping the backup volume to the secondary volume; and based on the I/O, copying the secondary volume to the backup volume through the SAN.

Aspects of the present disclosure can involve a non-transitory computer readable medium, storing instructions for a storage system connected to a backup storage system over a Storage Area Network (SAN), the backup storage system managed by a backup server, the storage system involving a primary volume and a secondary volume configured to be mounted to a backup volume in the backup storage system and configured to be paired with the primary volume, the instructions involving, for receipt of a backup operation request from the backup server, copying the primary volume to the secondary volume through a pair operation based on an Input/Output (I/O) between the storage system and a host computer managing the storage system; mapping the backup volume to the secondary volume; and based on the I/O, copying the secondary volume to the backup volume through the SAN.

Aspects of the present disclosure involve a storage system connected to a backup storage system over a Storage Area Network (SAN), the backup storage system managed by a backup server, the storage system involving a primary volume and a secondary volume configured to be mounted to a backup volume in the backup storage system and configured to be paired with the primary volume, and, for receipt of a backup operation request from the backup server, means for copying the primary volume to the secondary volume through a pair operation based on an Input/Output (I/O) between the storage system and a host computer managing the storage system; means for mapping the backup volume to the secondary volume; and based on the I/O, means for copying the secondary volume to the backup volume through the SAN.

BRIEF DESCRIPTION OF DRAWINGS

FIG. 3 is an example of backup data management table, in accordance with an example implementation.

FIG. 4 illustrates an example of volume management table, in accordance with an example implementation.

DETAILED DESCRIPTION

Figure 1:
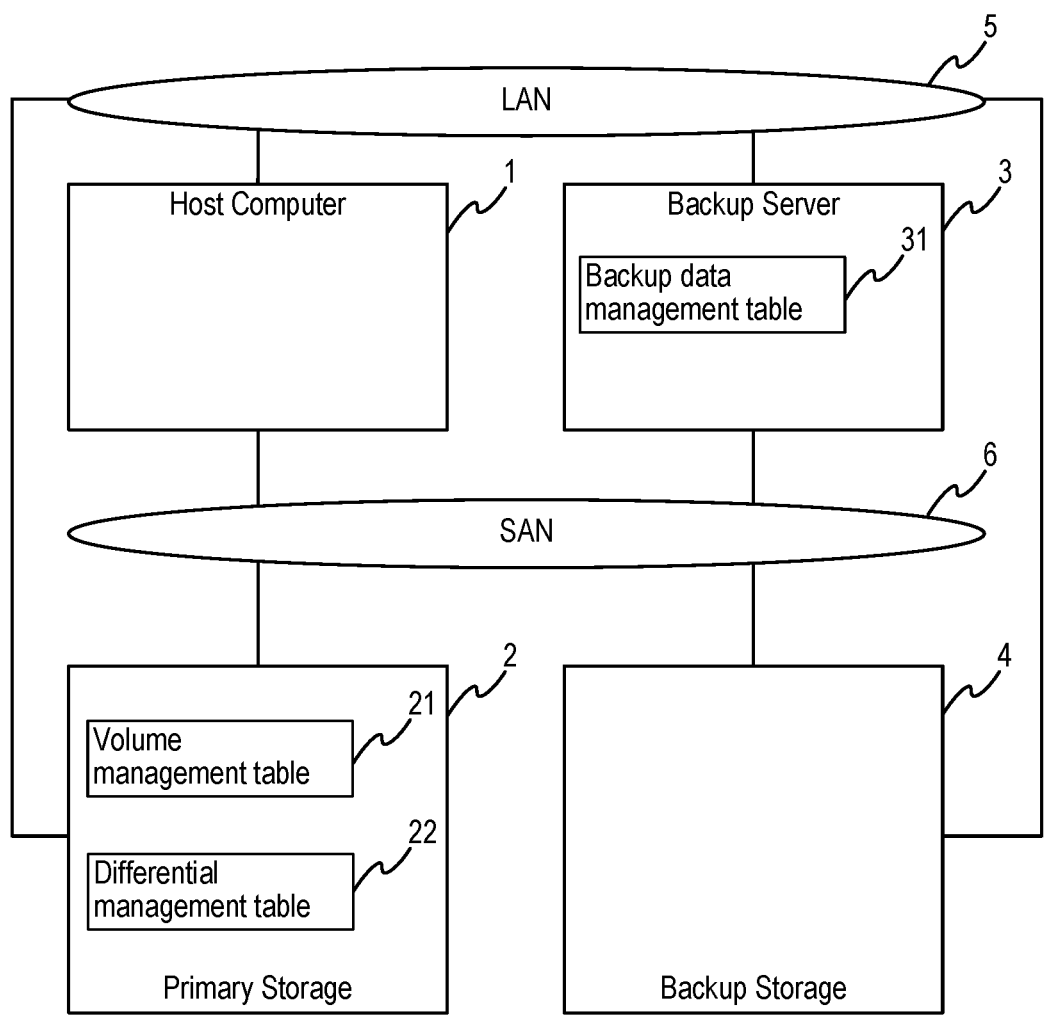
FIG. 1 illustrates an example block diagram showing an arrangement of a computer system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to the LAN-free and application-consistent backup with data copy offload from backup server to primary storage. The primary storage mounts the secondary storage volume and directly transfers the differential data of updates after the last backup. Such example implementations reduce the LAN network load and the load on the backup server and speeding up the backup process.

In example implementations, the primary storage conducts data copy to the secondary storage according to request from backup server. The backup server monitors the completion of data backup process and updates the volume information on the secondary storage as a point-in-time restore point.

Another benefit of data copy offload to primary storage is performance stability. Primary storage can control copy pace by monitoring the amount of workload from business-critical application. Throughout the present disclosure, identifiers (IDs) or names are used as identification information of elements, but other kinds of identification information may be used instead of, or in addition to, IDs and names.

In the following description, a "host system" is a system configured to transmit an I/O request to a storage system, and may include an interface device, a storage unit (for example, a memory), and a processor coupled thereto. The host system may be formed of one or more host computers. At least one host computer may be a physical computer, and the host system may include a virtual host computer in addition to the physical host computer.

In the following description, the "storage system" may be one or more storage apparatuses, and may include a plurality of physical drives (for example, one or more Redundant Array of Inexpensive Disks (RAID) groups) and a storage controller configured to control I/O to and from the plurality of physical drives. The storage controller may include a back-end interface device coupled to the plurality of physical drives, a front-end interface device coupled to at least one of the host systems or the management system, a storage unit, and a processor coupled thereto. The storage controller may be redundant.

FIG. 1 illustrates an example block diagram showing an arrangement of a computer system, in accordance with an example implementation. In the example system, there are one or more host computers 1, primary storage systems 2, backup servers 3 and backup storage systems 4 that are all interconnected through Local Area Network (LAN) 5. Storage Area Network (SAN) 6 also facilitates connections between the primary storage systems 2 and the one or more host computers 1, and also facilitate connections between the backup servers 3 and the backup storage systems 4.

Figure 5:
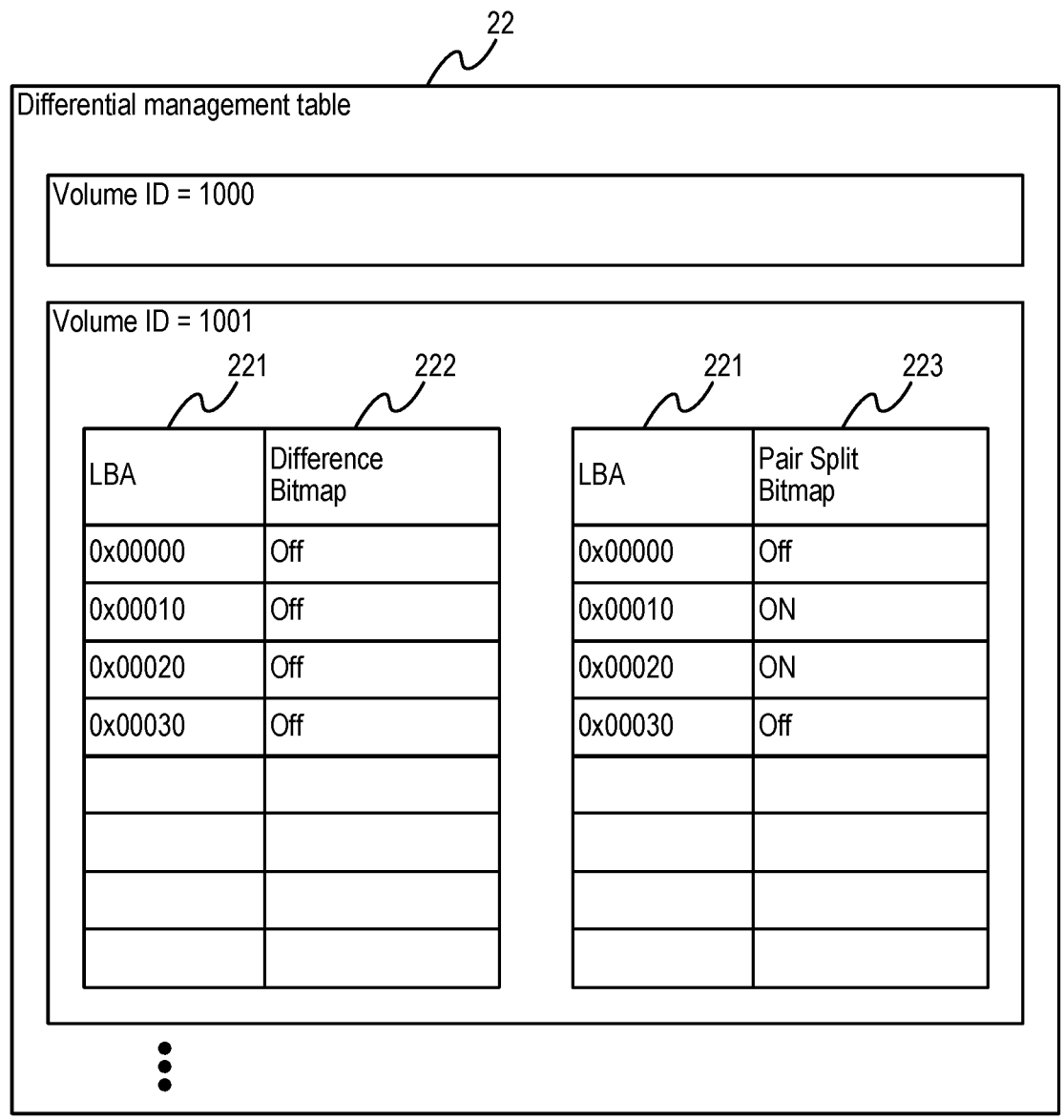
FIG. 5 illustrates an example of differential management table, in accordance with an example implementation.

Backup server 3 can include backup data management table 31 as illustrated at FIG. 3. Primary storage system 2 can manage volume management table 21 as illustrated in FIG. 4, and differential management table 22 as illustrated in FIG. 5.

Figure 2:
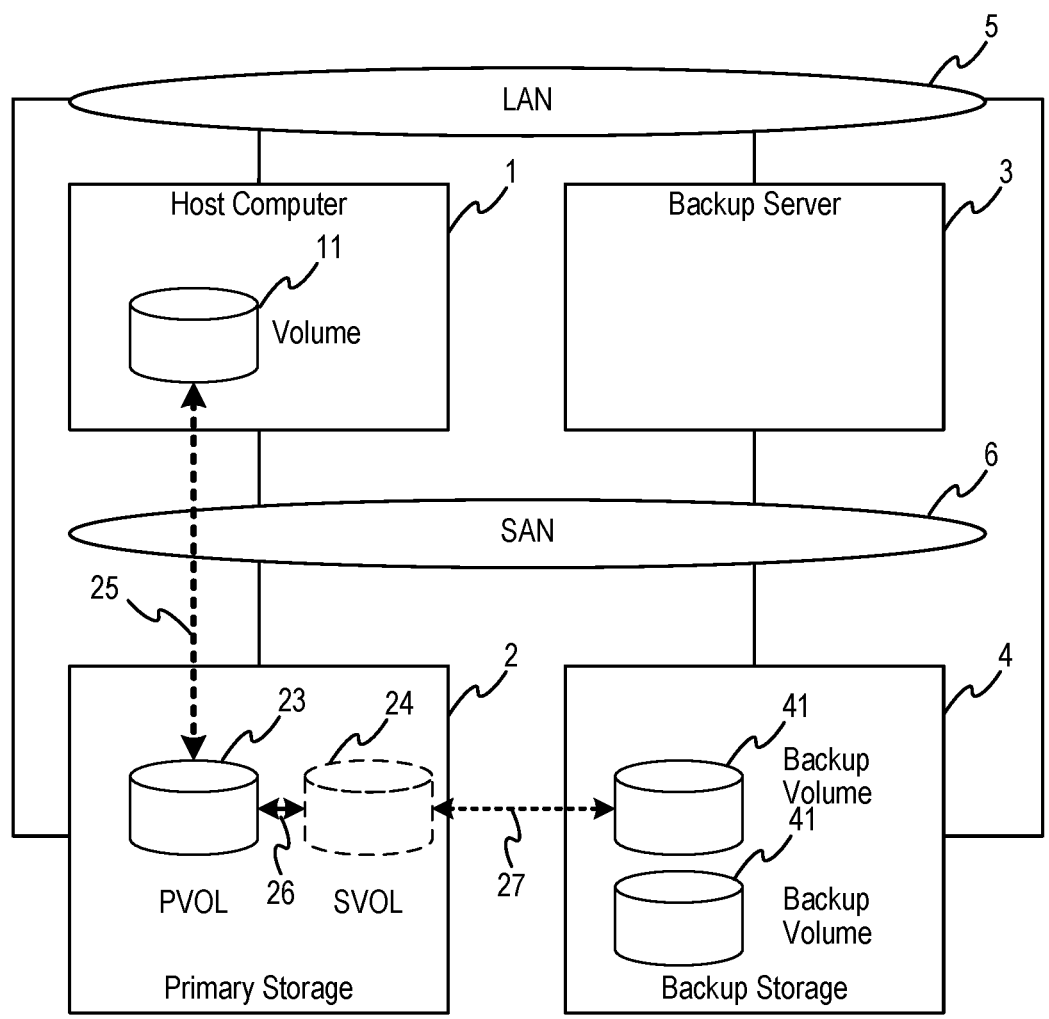
FIG. 2 illustrates an example of a data copy offload backup, in accordance with an example implementation.

FIG. 2 illustrates an example of a data copy offload backup, in accordance with an example implementation. In this example, host computer 1 manages a logical volume 11, which is stored as primary volume PVOL 23. When data is written to logical volume 11, the host computer 1 manages the write data in cache memory until it is later destaged 25 to PVOL 23 at a scheduled time. Primary storage manages a secondary volume SVOL 24, which is configured to be mapped from a backup volume 41. When backup operations are scheduled, PVOL 24 then copies 26 the write data over to SVOL 24 and SVOL 24 can then be copied over 27 to backup volume 41.

FIG. 3 is an example of backup data management table, in accordance with an example implementation. Backup data management table 31 is created by and stored on backup Server 3 to manage which application data was backed up to which volume and when the backup occurred. Backup data management table has following information.

Application name 311 is an application identifier of the application that is running on Host Computer 1. Backup date 312 indicates the date when the application is backed up to the backup storage 4. This indicates the point-in-time recovery point of the backup date 312 was stored on backup storage 4. When backup server 3 generates a backup, a new row is added on the backup data management table 31. Volume identifier (ID) of backup source 313 and Volume ID of backup target 314 are identifiers regarding which volume on the primary storage is backed up to which volume on the backup storage. Copy status 315 indicates the backup state.

FIG. 4 illustrates an example of volume management table, in accordance with an example implementation. This table is created by, and stored on, primary storage system 2. This table can include Volume ID 211, Pair Status 212 and Paired Volume ID 213. In this example implementation, primary storage system 2 manages a pair relationship between backup source volume and backup target volume. Volume ID 211 indicates the backup source volume ID on primary storage system 2. Paired volume ID 213 indicates backup target volume ID. Pair Status 212 can involve the following states. "Simplex" indicates that the volume is not protected. "Pair" indicates that the volume is protected and monitored for the updated logical block address (LBA) after the last backup was taken. In this status, the storage system does not require a request to be backed up by backup server, but is facilitated by asynchronous copy as allowed by backup server. "Pair split" indicates that the volume is protected and monitored with the updated LBA after the last backup was taken, but the storage system does not execute any data copy process. "Pair splitting" indicates that the volume is a running copy data process as requested by the backup server.

FIG. 5 illustrates an example of Differential Management Table 22, in accordance with an example implementation. This table is created by and stored on primary storage system 2. The difference bitmap determines the updated LBA 221 after the last backup is taken. Pairsplit bitmap 223 determines the LBA 221 to be copied for completing the ongoing backup. In other words, pairsplit bitmap 223 is equal to the state of the difference bitmap 222 at the time the storage system is requested to generate a backup by backup server 3. Pairsplit bitmap 223 is indicative of differences in logical block addresses LBAs between the primary volume and the secondary volume to be copied over for the backup operation, whereas the difference bitmap 222 is indicative of current differences in LBAs between the primary volume and the secondary volume (e.g., indicated differences can be caused by write operations from host computer 1 to primary storage system 2).

Figure 6:
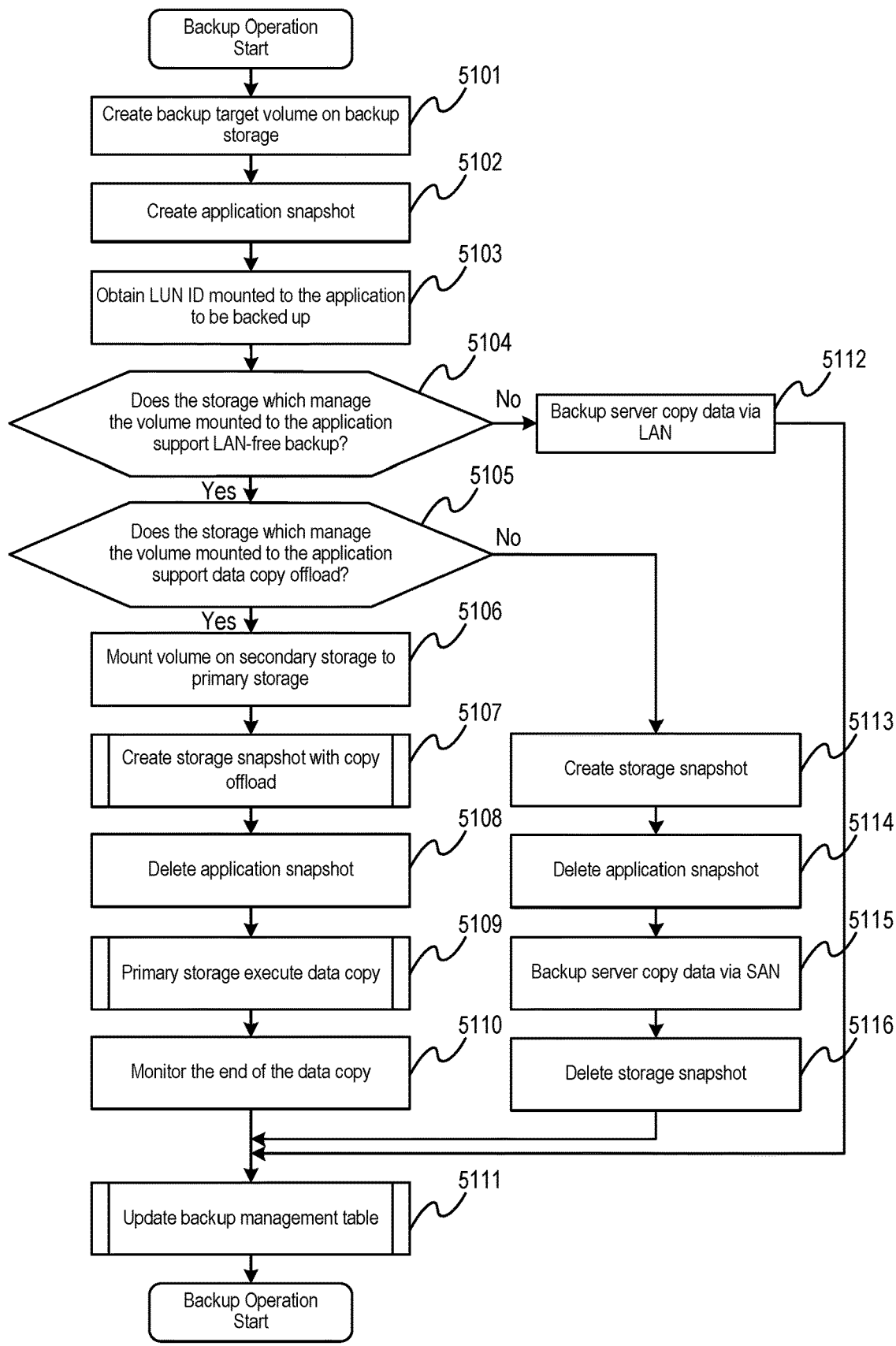
FIG. 6 illustrates an example flowchart for the backup operation, in accordance with an example implementation.

FIG. 6 illustrates an example flowchart for the backup operation, in accordance with an example implementation. Backup server conducts application data backup through executing the operations of the flowchart.

At 5101, the flow creates a backup target volume on the backup storage. At 5102, the flow creates an application snapshot. At 5103, the flow obtains the logical unit number (LUN) ID mounted to the application to be backed up.

At 5104, a determination is made as to whether the storage which manages the volume mounted to the application supports LAN-free backup, or if the SAN connection between the secondary volume and the backup server is available and no failure has occurred. If so (Yes), the flow proceeds to 5105, otherwise (No) the flow proceeds to 5112 to backup the server copy data via LAN.

At 5105, a determination is made as to whether the storage which manages the volume mounted to the application support data copy offload (e.g., the SAN connection between the secondary volume is available and no failure has occurred). If so (Yes) the flow proceeds to 5106, otherwise (No) the flow proceeds to 5113.

At 5107, the flow mounts the volume on the backup storage to the primary storage. At 5108, the flow deletes the application snapshot. At 5109, the primary storage executes the data copy operation. At 5110, the flow monitors the end of the data copy. At 5111, the flow updates the backup data management table 31.

At 5113, the flow creates the storage snapshot. At 5114, the flow deletes the application snapshot. At 5115, the backup server copies the data via SAN. At 5116, the flow deletes the storage snapshot.

Figure 7:
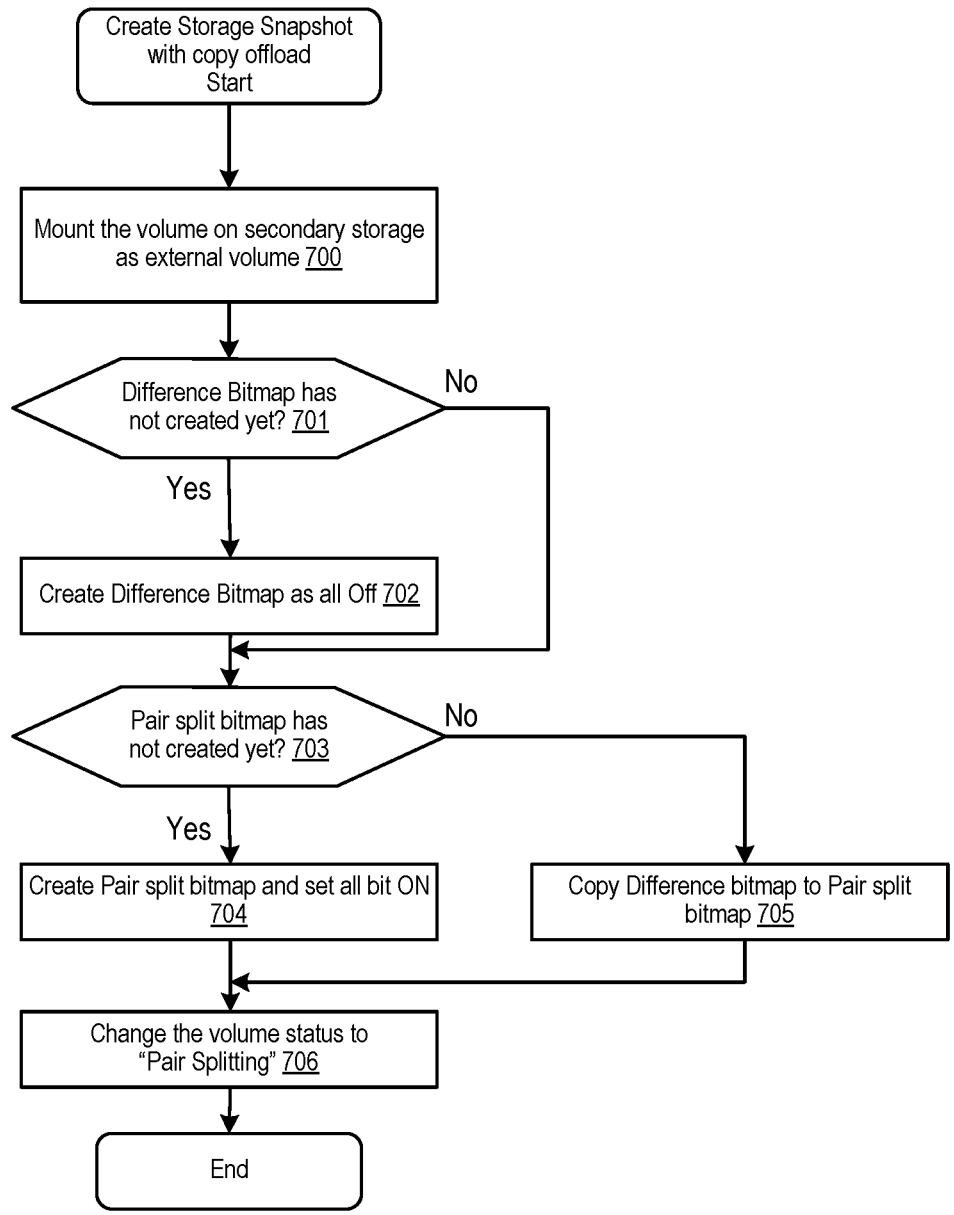
FIG. 7 illustrates an example flowchart for creating a storage snapshot with copy offload, in accordance with an example implementation.

FIG. 7 illustrates an example flowchart for creating a storage snapshot with copy offload, in accordance with an example implementation. At 700, the flow mounts the volume on the secondary storage as an external volume. At 701, a determination is made as to whether the difference bitmap has been created yet. If so (Yes) the flow proceeds to 702, otherwise (No) the flow proceeds to 703.

At 702, the flow creates the difference bitmap as all Off. At 703, a determination is made as to whether the pair split bitmap has been created yet. If it has not been created (Yes), the flow proceeds to 704 to create the pair split bitmap and set all bits to be ON. Otherwise (No), the flow proceeds to 705 to copy the difference bitmap to the pair split bitmap. At 706, the flow changes the volume status to "Pair Splitting".

Figure 8:
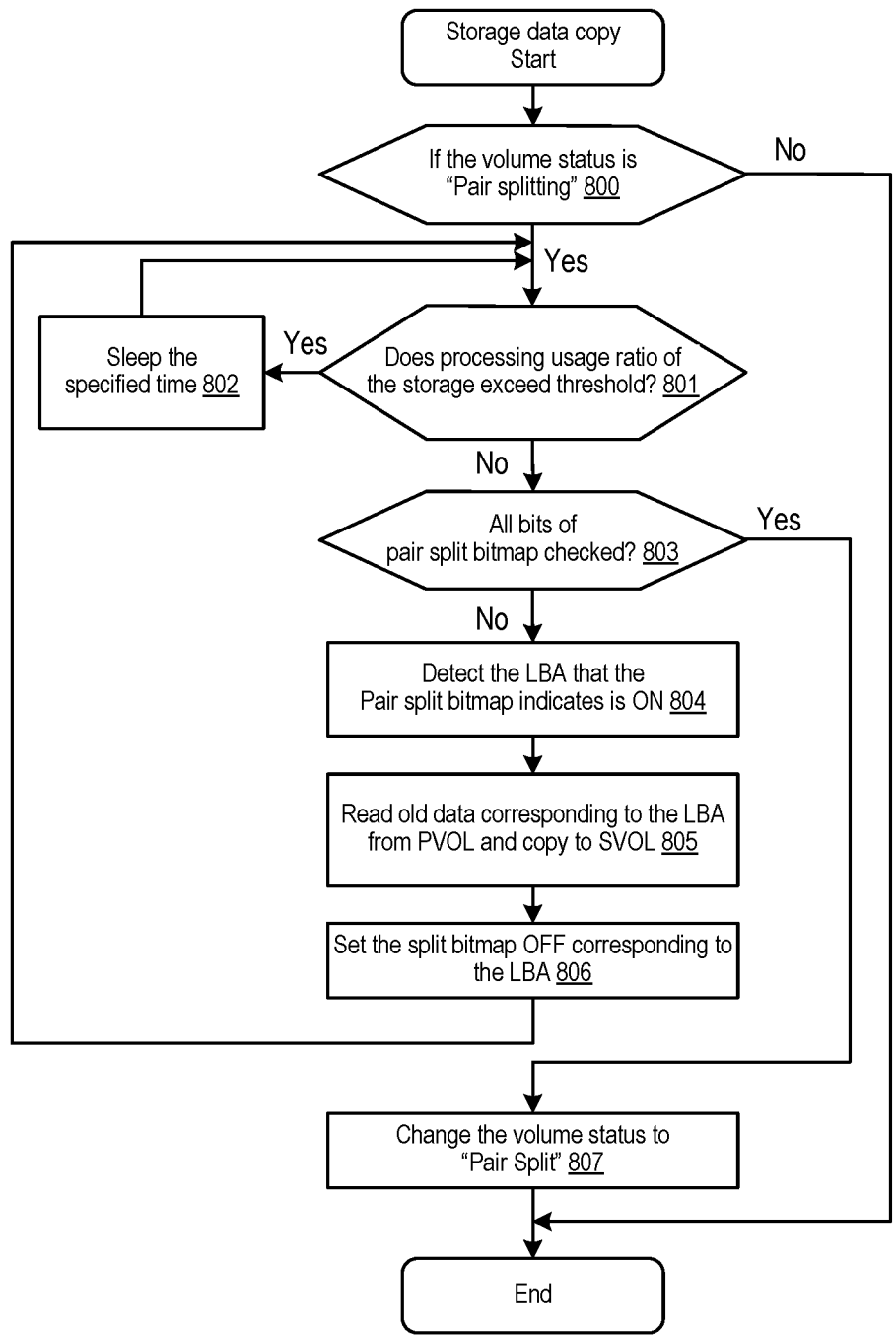
FIG. 8 illustrates an example flowchart for the storage data copy process, in accordance with an example implementation.

FIG. 8 illustrates an example flowchart for the storage data copy process, in accordance with an example implementation. At 800, a determination is made as to whether the volume status is "Pair splitting". If so (Yes), then the flow proceeds to 801, otherwise (No) the flow ends.

At 801, a determination is made as to whether the processing usage ratio of the primary storage system exceed a threshold. The processing usage ratio can be determined based on the volume of I/O between the primary storage system and the host computer. If the volume of I/O is below a threshold as set by an administrator, then it is a better time to initiate the storage data copy process. If so (Yes), then the flow proceeds to 802 to sleep the specified time as the storage system currently has too much I/O volume. Otherwise (No) the flow proceeds to 803 to check all bits of the pair split bitmap. If all of the bits have been checked (Yes), then the flow proceeds to 807. Otherwise (No), then the flow proceeds to 804 to detect the LBA that has the pair split bitmap of ON. At 805, the flow reads the old data corresponding to the LBA from PVOL and copies the new data to the SVOL. At 806, the flow sets the split bitmap OFF corresponding to the LBA. At 807, the flow changes the volume status to "Pair Split".

Figure 9:
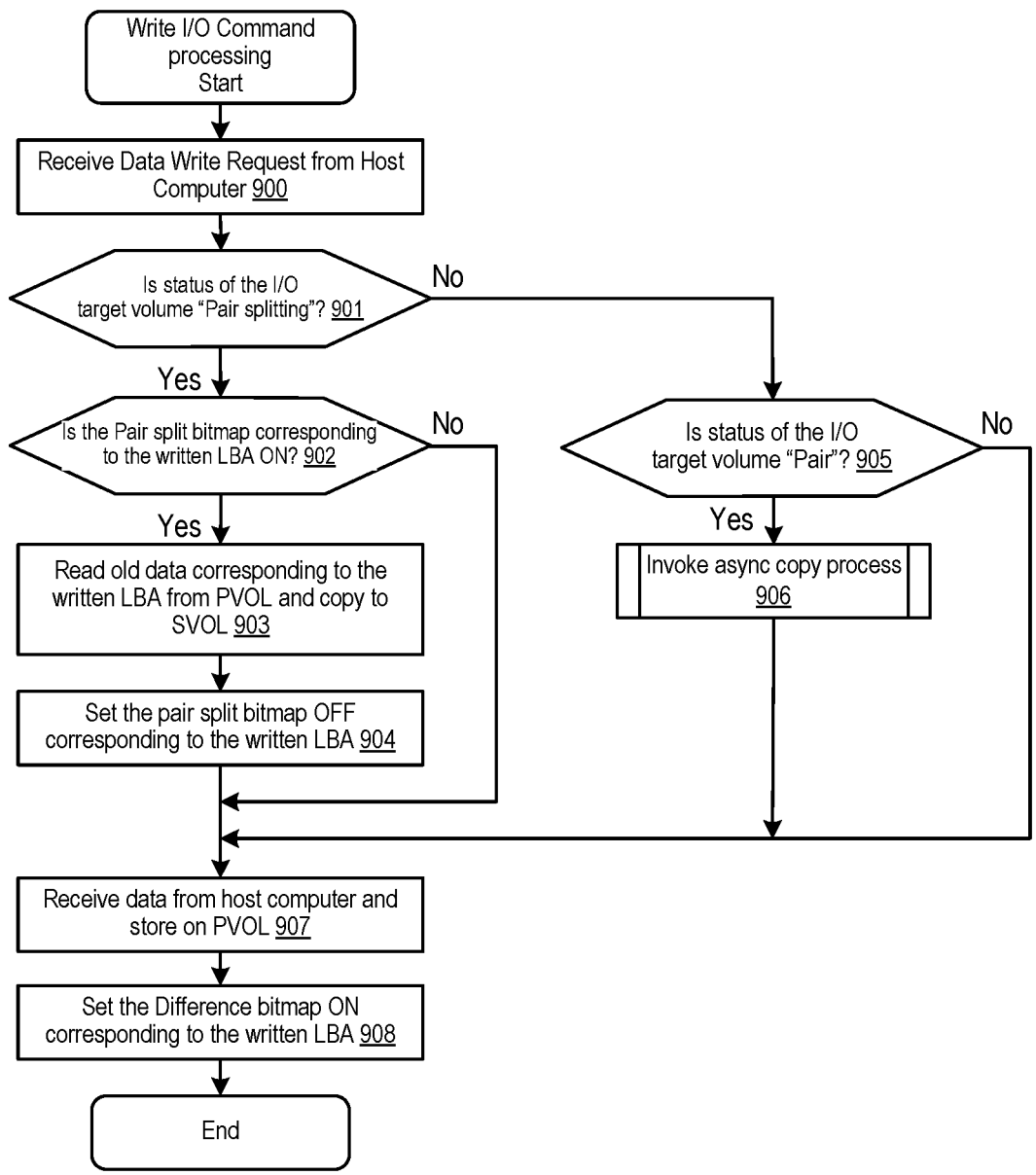
FIG. 9 illustrates an example flowchart of the write I/O command process, in accordance with an example implementation.

FIG. 9 illustrates an example flowchart of the write I/O command process, in accordance with an example implementation. At 900, the flow receives a data write request from the host computer. At 901, a determination is made as to whether of status of the I/O target volume is "Pair splitting". If so (Yes) then the flow proceeds to 902, otherwise (No) the flow proceeds to 905.

At 902, the flow makes a determination as to whether a pair split bitmap corresponding to the written LBA is set to ON. If so (Yes), then the flow proceeds to 903, otherwise (No), the flow proceeds to 907. At 903, the flow reads old data corresponding to the written LBA from PVOL and copies the updated data to SVOL. The difference bitmap corresponding to the LBA is set to OFF.

At 904, the flow sets the pair split bitmap to OFF corresponding to the written LBA.

At 905, the flow makes a determination as to whether the status of the I/O target volume is set to "Pair". If so (Yes), then the flow proceeds to 906 to invoke the asynchronous copy process, otherwise (No) the flow proceeds to 907.

At 907, the flow receives data from host computer and stores the data on the PVOL. At 908, the flow sets the difference bitmap corresponding to the written LBA to be ON.

Figure 10:
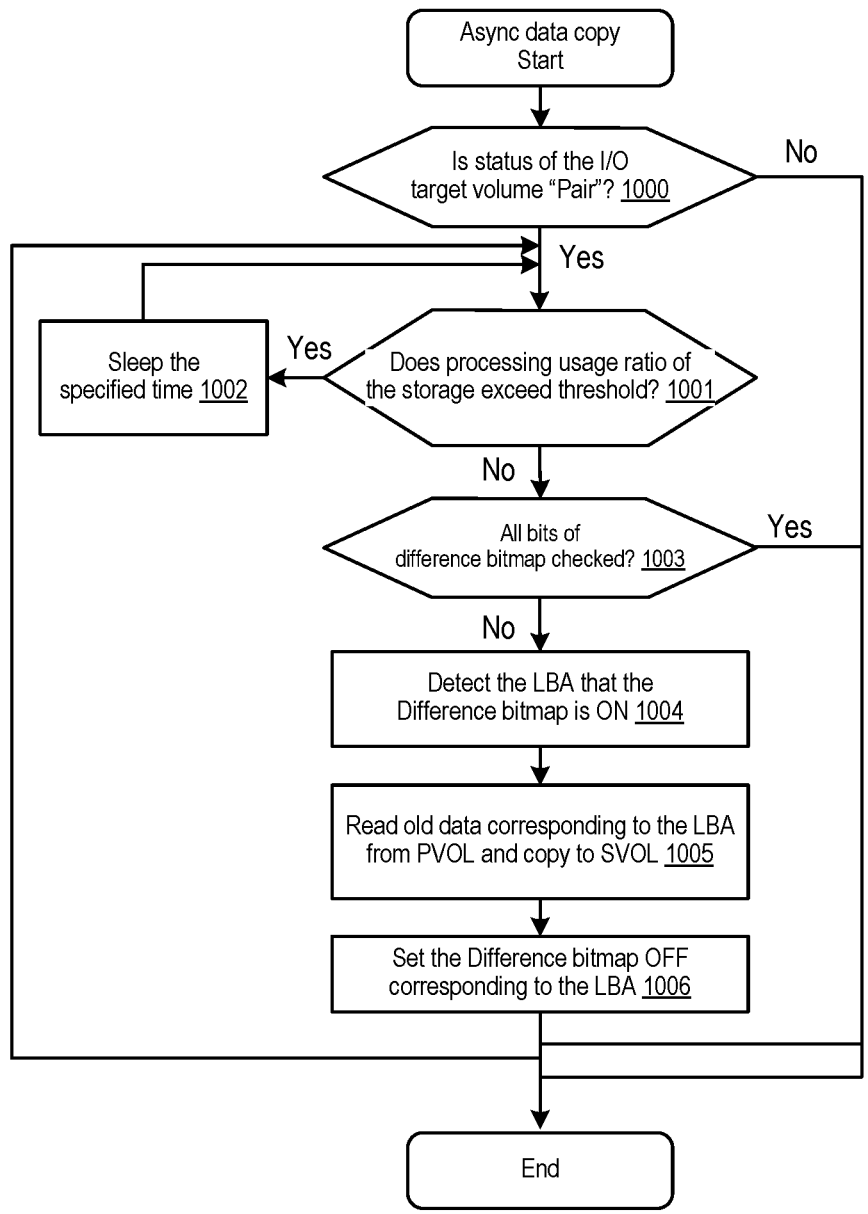
FIG. 10 illustrates an example flowchart of the asynchronous data copy, in accordance with an example implementation.

FIG. 10 illustrates an example flowchart of the asynchronous data copy, in accordance with an example implementation. At 1000, a determination is made as to whether the status of the I/O target volume is "Pair". If so (Yes) the flow proceeds to 1001, otherwise (No) the flow ends.

At 1001, a determination is made as to whether the processing usage ratio of the storage exceed threshold. The processing usage ratio can be determined based on the volume of I/O between the primary storage system and the host computer. If the volume of I/O is below a threshold as set by an administrator, then it is a better time to initiate the storage data copy process. If so (Yes), then the flow proceeds to 1002 to sleep (e.g., halt the process) for the specified time, otherwise (No) the flow proceeds to 1003. At 1003, a determination is made as to whether all bits of the difference bitmap are checked. If so (Yes), then the flow ends, otherwise (No) the flow proceeds to 1004.

At 1004, the flow detects the LBA with the difference bitmap set to ON. At 1005, the flow determines the old data corresponding to the LBA from PVOL and copies the updated data to SVOL. At 1006, the flow sets the Difference bitmap corresponding to the LBA to OFF.

Example implementations are directed to accelerating application-consistent backing up time and reduce RPO by offloading data backing up process from backup server to primary storage. The primary storage conducts data copy to the secondary storage according to request from the backup server. The backup server monitors the completion of data backup process and updates the volume information on the secondary storage as a point-in-time restore point.

Through the example implementations described herein, it is thereby possible to offload backup operations to the storage system and reduce backup server workload, control backup jobs without affecting the primary volume and reduce backup time by copying asynchronously.

Figure 11:
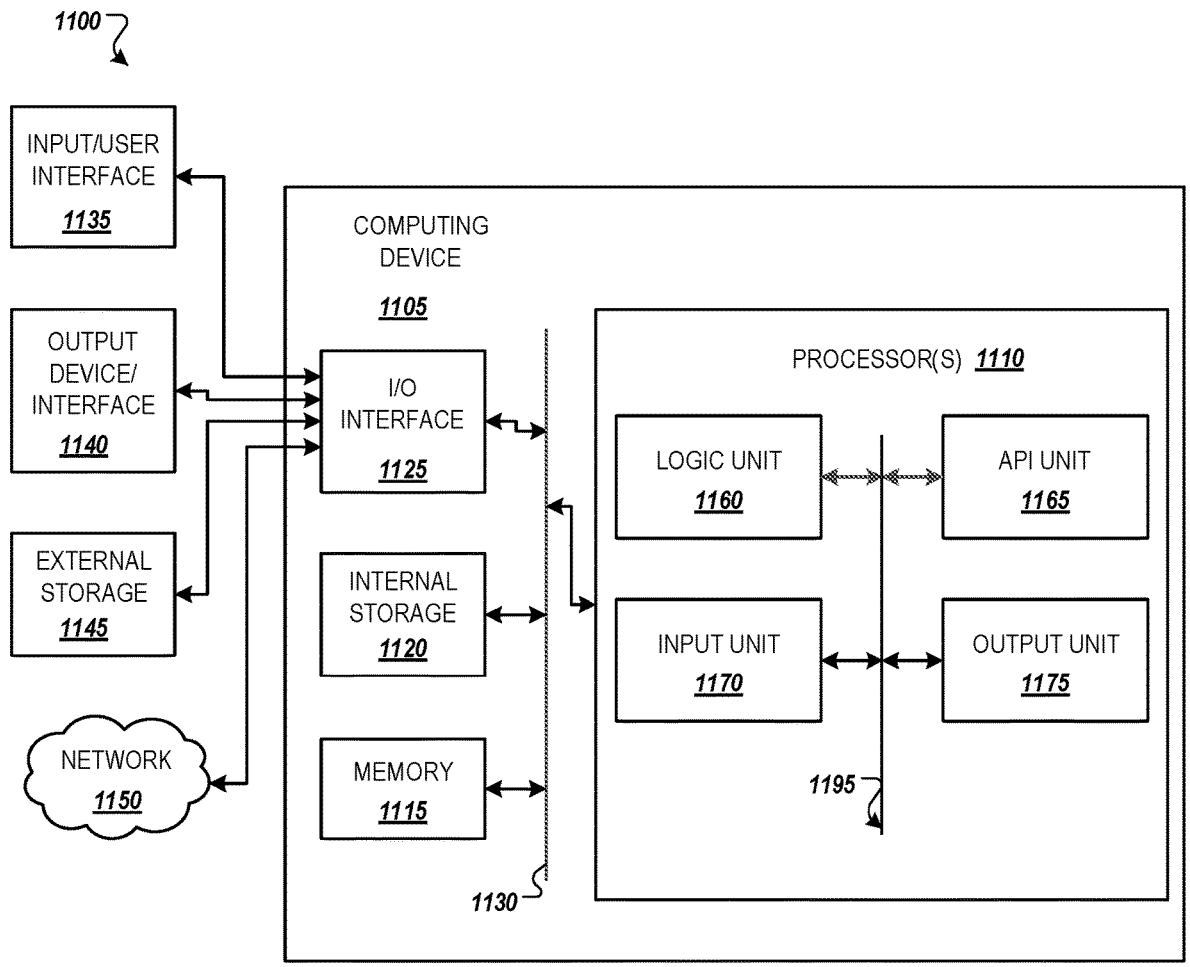
FIG. 11 illustrates an example computing environment with an example computer device suitable for use in some example implementations.

FIG. 11 illustrates an example computing environment with an example computer device suitable for use in some example implementations, such as a storage controller configured to control primary storage system 2 as illustrated in FIG. 1, and can be similarly be applied to facilitate backup storage system 4, backup server 3, and host computer 1. Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or 10 interface 1125, any of which can be coupled on a communication mechanism or bus 1130 for communicating information or embedded in the computer device 1105. 10 interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via 10 interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

10 interface 1125 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided. Processor(s) 1110 can be in the form of hardware processors such as central processing units (CPUs) or in a combination of hardware and software units.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

For implementations involving primary storage system 2, external storage 1145 can include one or more storage devices (e.g., hard disk drives, flash drives, etc.) that can be utilized to provide storage for primary volume and a secondary volume configured to be mounted to a backup volume in the backup storage system and configured to be paired with the primary volume as illustrated in FIG. 1.

Processor(s) 1110 can be configured to, for receipt of a backup operation request from the backup server, copy the primary volume to the secondary volume through a pair operation based on an Input/Output (I/O) between the storage system and a host computer managing the storage system; mapping the backup volume to the secondary volume; and based on the I/O, copy the secondary volume to the backup volume through the SAN as illustrated in FIG. 2 and FIG. 6. The I/O between the storage system and the host computer managing the storage system can be utilized to determine the processing usage ratio as illustrated in FIG. 8 and FIG. 10.

Processor(s) 1110 is configured to copy the primary volume to the secondary volume through the pair operation based on the I/O between the storage system and the host computer managing the storage system by providing a first difference bitmap and a second difference bitmap between the primary volume and the secondary volume, the first difference bitmap indicative of differences in logical block addresses LBAs between the primary volume and the secondary volume to be copied over for the backup operation such as pairsplit bitmap 223, the second difference bitmap indicative of current differences in LBAs between the primary volume and the secondary volume such as difference bitmap 222 as illustrated in FIG. 7, for each LBA in the first difference bitmap indicative of a difference (e.g., bit is ON), copying the each LBA from the primary volume to the secondary volume; and upon completion of the copying of the each LBA, setting the first difference bitmap corresponding to the each LBA as not having a difference (e.g., bit is OFF).

Processor(s) 1110 can be configured to provide the first difference bitmap and the second difference bitmap between the primary volume and the secondary volume by copying the second difference bitmap to the first difference bitmap in response to the backup operation request as illustrated at 705 of FIG. 7.

Processor(s) 1110 can be configured to, for receipt of a write operation request to the primary volume during execution of the backup operation, for a target logical block address (LBA) associated with the write operation request in a first difference bitmap between the primary volume and the secondary volume indicated as having a difference, the first difference bitmap indicative of differences in LBAs between the primary volume and the secondary volume to be copied over for the backup operation, copy data from the primary volume associated with the target LBA to the secondary volume; and set the first difference bitmap corresponding to the target LBA as having no difference; write data associated with the write operation request to the primary volume; and set a second difference bitmap corresponding to the target LBA associated with the write data as having the difference (e.g. bit is ON), the second difference bitmap indicative of current differences in LBAs between the primary volume and the secondary volume as illustrated at 901-904 and 907-908 of FIG. 9.

Processor(s) 1110 is configured to, for receipt of a write operation request to the primary volume and for the primary volume being paired with the secondary volume, for each logical block address (LBA) in a second difference bitmap between the primary volume and the second volume being indicated as having a difference, copy data corresponding to the each LBA indicated as having the difference (e.g., bit is ON) to the secondary volume; and set the second difference bitmap corresponding to the each LBA as not having the difference (e.g., set bit to OFF); write data associated with the write operation request to the primary volume; and set the second difference bitmap corresponding to one or more target LBA associated with the write data as having the difference as illustrated in FIG. 10.

Processor(s) 1110 can be configured to, for receipt of the backup operation request from the backup server, for a failure or unavailability of a SAN connection between the secondary volume and the backup volume (e.g., SAN network is down, mount has disconnected or failed), copy the secondary volume to the backup server over the SAN as illustrated at 5113-5116 of FIG. 6; and for the failure or the unavailability of the SAN connection between the secondary volume and the backup server (e.g., SAN network is down), copy the secondary volume to the backup server over Local Area Network (LAN) as illustrated at 5112 of FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A storage system connected to a backup storage system over a Storage Area Network (SAN), the backup storage system being managed by a backup server, the storage system comprising:
    a primary volume;
    a secondary volume configured to be mounted to a backup volume in the backup storage system and further being configured to be paired with the primary volume; and
    a processor configured to, for receipt of a backup operation request from the backup server:
        copy the primary volume to the secondary volume through a pair operation based on an Input/Output (I/O) between the storage system and a host computer managing the storage system;
        mount the secondary volume to the backup volume;
        based on the I/O, copy the secondary volume to the backup volume through the SAN;
        copy the primary volume to the secondary volume through the pair operation based on the I/O between the storage system and the host computer managing the storage system by providing a first difference bitmap and a second difference bitmap between the primary volume and the secondary volume, the first difference bitmap indicative of differences in logical block addresses LBAs between the primary volume and the secondary volume to be copied over for the backup operation, the second difference bitmap indicative of current differences in LBAs between the primary volume and the secondary volume;
        for each LBA in the first difference bitmap indicative of a difference:
            copying the each LBA from the primary volume to the secondary volume; and
            upon completion of the copying of the each LBA, setting the first difference bitmap corresponding to the each LBA as not having a difference; and
        provide the first difference bitmap and the second difference bitmap between the primary volume and the secondary volume by copying the second difference bitmap to the first difference bitmap in response to the backup operation request.

2. The storage system of claim 1, wherein the processor is configured to, for receipt of a write operation request to the primary volume during execution of the backup operation:
    for a target logical block address (LBA) associated with the write operation request in a first difference bitmap between the primary volume and the secondary volume indicated as having a difference, the first difference bitmap indicative of differences in LBAs between the primary volume and the secondary volume to be copied over for the backup operation:
        copy data from the primary volume associated with the target LBA to the secondary volume; and
        set the first difference bitmap corresponding to the target LBA as having no difference;
    write data associated with the write operation request to the primary volume; and
    set a second difference bitmap corresponding to the target LBA associated with the write data as having the difference, the second difference bitmap indicative of current differences in LBAs between the primary volume and the secondary volume.

3. The storage system of claim 1, wherein the processor is configured to, for receipt of a write operation request to the primary volume and for the primary volume being paired with the secondary volume:
    for each logical block address (LBA) in the second difference bitmap between the primary volume and the second volume being indicated as having a difference:
        copy data corresponding to the each LBA indicated as having the difference to the secondary volume; and
        set the second difference bitmap corresponding to the each LBA as not having the difference;
    write data associated with the write operation request to the primary volume; and
    set the second difference bitmap corresponding to one or more target LBA associated with the write data as having the difference.

4. The storage system of claim 1, wherein the processor is configured to, for receipt of the backup operation request from the backup server:
    for a failure or unavailability of a SAN connection between the secondary volume and the backup volume, copy the secondary volume to the backup server over Local Area Network (LAN);
    for the failure or the unavailability of the SAN connection between the secondary volume and the backup server, copy the secondary volume to the backup server over the LAN.

5. A method for a storage system connected to a backup storage system over a Storage Area Network (SAN), the backup storage system being managed by a backup server, the storage system comprising a primary volume and a secondary volume configured to be mapped from a backup volume in the backup storage system and configured to be paired with the primary volume, the method comprising:
    for receipt of a backup operation request from the backup server:
        copying the primary volume to the secondary volume through a pair operation based on an Input/Output (I/O) between the storage system and a host computer managing the storage system;
        mapping the backup volume to the secondary volume; and
        based on the I/O, copying the secondary volume to the backup volume through the SAN, wherein the copying the primary volume to the secondary volume through the pair operation based on the I/O between the storage system and the host computer managing the storage system comprises:
providing a first difference bitmap and a second difference bitmap between the primary volume and the secondary volume, the first difference bitmap indicative of differences in logical block addresses LBAs between the primary volume and the secondary volume to be copied over for the backup operation, the second difference bitmap indicative of current differences in LBAs between the primary volume and the secondary volume;
for each LBA in the first difference bitmap indicative of a difference:
copying the each LBA from the primary volume to the secondary volume; and
upon completion of the copying of the eachLBA, setting the first difference bitmap corresponding to the each LBA as not having a difference, and
wherein the providing the first difference bitmap and the second difference bitmap between the primary volume and the secondary volume comprises copying the first difference bitmap to the second difference bitmap in response to the backup operation request.

6. The method of claim 5, further comprising, for receipt of a write operation request to the primary volume during execution of the backup operation:
for a target logical block address (LBA) associated with the write operation request in a first difference bitmap between the primary volume and the secondary volume indicated as having a difference, the first difference bitmap indicative of differences in LBAs between the primary volume and the secondary volume to be copied over for the backup operation:
copying data from the primary volume associated with the target LBA to the secondary volume; and
setting the first difference bitmap corresponding to the target LBA as having no difference;
writing data associated with the write operation request to the primary volume; and
setting a second difference bitmap corresponding to the target LBA associated with the write data as having the difference, the second difference bitmap indicative of current differences in LBAs between the primary volume and the secondary volume.

7. The method of claim 5, further comprising, for receipt of a write operation request to the primary volume and for the primary volume being paired with the secondary volume:
for each logical block address (LBA) iii the second difference bitmap between the primary volume and the second volume being indicated as having a difference:
copying data corresponding to the each LBA indicated as having the difference to the secondary volume; and
setting the second difference bitmap corresponding to the each LBA as not having the difference;
writing data associated with the write operation request to the primary volume; and
setting the second difference bitmap corresponding to one or more target LBA associated with the write data as having the difference.

8. The method of claim 5, further comprising, for receipt of the backup operation request from the backup server:
for a failure or unavailability of a SAN connection between the secondary volume and the backup volume, copy the secondary volume to the backup server over Local Area Network (LAN);
for the failure or the unavailability of the SAN connection between the secondary volume and the backup server, copy the secondary volume to the backup server over the LAN.

9. A non-transitory computer readable medium, storing instructions for a storage system connected to a backup storage system over a Storage Area Network (SAN), the backup storage system being managed by a backup server, the storage system comprising a primary volume and a secondary volume configured to be mounted to a backup volume in the backup storage system and configured to be paired with the primary volume, the instructions comprising:
for receipt of a backup operation request from the backup server:
copying the primary volume to the secondary volume through a pair operation based on an Input/Output (I/O) between the storage system and a host computer managing the storage system;
mapping the backup volume to the secondary volume; and
based on the I/O, copying the secondary volume to the backup volume through the SAN,
wherein the copying the primary volume to the secondary volume through the pair operation based on the I/O between the storage system and the host computer managing the storage system comprises:
providing a first difference bitmap and a second difference bitmap between the primary volume and the secondary volume, the first difference bitmap indicative of differences in logical block addresses LBAs between the primary volume and the secondary volume to be copied over for the backup operation, the second difference bitmap indicative of current differences in LBAs between the primary volume and the secondary volume;
for each LBA in the first difference bitmap indicative of a difference:
copying the each LBA from the primary volume to the secondary volume; and
upon completion of the copying of the each LBA, setting the first difference bitmap corresponding to the each LBA as not having a difference, and
wherein the providing the first difference bitmap and the second difference bitmap between the primary volume and the secondary volume comprises copying the first difference bitmap to the second difference bitmap in response to the backup operation request.

10. The non-transitory computer readable medium of claim 9, the instructions further comprising, for receipt of a write operation request to the primary volume during execution of the backup operation:
for a target logical block address (LBA) associated with the write operation request in a first difference bitmap between the primary volume and the secondary volume indicated as having a difference, the first difference bitmap indicative of differences in LBAs between the primary volume and the secondary volume to be copied over for the backup operation:
copying data from the primary volume associated with the target LBA to the secondary volume; and
setting the first difference bitmap corresponding to the target LBA as having no difference;
writing data associated with the write operation request to the primary volume; and setting a second difference bitmap corresponding to the target LBA associated with the write data as having the difference, the second difference bitmap indicative of current differences in LBAs between the primary volume and the secondary volume.

11. The non-transitory computer readable medium of claim 9, the instructions further comprising, for receipt of a write operation request to the primary volume and for the primary volume being paired with the secondary volume:
for each logical block address (LBA) in the second difference bitmap between the primary volume and the second volume being indicated as having a difference:
copying data corresponding to the each LBA indicated as having the difference to the secondary volume; and
setting the second difference bitmap corresponding to the each LBA as not having the difference;
writing data associated with the write operation request to the primary volume; and
setting the second difference bitmap corresponding to one or more target LBA associated with the write data as having the difference.

12. The non-transitory computer readable medium of claim 9, the instructions further comprising, for receipt of the backup operation request from the backup server:
for a failure or unavailability of a SAN connection between the secondary volume and the backup volume, copy the secondary volume to the backup server over Local Area Network (LAN);
for the failure or the unavailability of the SAN connection between the secondary volume and the backup server, copy the secondary volume to the backup server over the LAN.

* * * * *